US010489579B2

(12) United States Patent
Lu et al.

(10) Patent No.: US 10,489,579 B2
(45) Date of Patent: Nov. 26, 2019

(54) AUTHENTICATION SYSTEM AND METHOD FOR ELECTRONIC GOVERNOR OF UNMANNED AERIAL VEHICLE

(71) Applicant: NUVOTON TECHNOLOGY CORPORATION, Hsinchu (TW)

(72) Inventors: Chih-Ping Lu, Hsinchu (TW); Tzu-Lan Shen, Taoyuan (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 399 days.

(21) Appl. No.: 15/366,477

(22) Filed: Dec. 1, 2016

(65) Prior Publication Data

US 2017/0329956 A1 Nov. 16, 2017

(30) Foreign Application Priority Data

Dec. 3, 2015 (TW) .............................. 104140611 A

(51) Int. Cl.
*H04L 29/06* (2006.01)
*G06F 21/44* (2013.01)
*G06F 21/62* (2013.01)
*H04L 9/08* (2006.01)
*H04L 9/32* (2006.01)

(52) U.S. Cl.
CPC ........ *G06F 21/445* (2013.01); *G06F 21/6218* (2013.01); *H04L 9/0869* (2013.01); *H04L 9/3234* (2013.01); *H04L 9/3263* (2013.01); *G06F 2221/2107* (2013.01)

(58) Field of Classification Search
CPC .... G06F 21/445; G06F 21/45; G06F 21/6218; G06F 2221/2107; H04L 9/0869; H04L 9/3234; H04L 9/3263
See application file for complete search history.

(56) References Cited

U.S. PATENT DOCUMENTS

| 9,056,676 | B1 * | 6/2015 | Wang ........................ B64F 1/00 |
| 9,412,278 | B1 * | 8/2016 | Gong ....................... G06F 16/29 |
| 9,531,689 | B1 * | 12/2016 | Romero-Mariona ....................... H04L 63/0471 |
| 2011/0035149 | A1 * | 2/2011 | McAndrew .......... G05D 1/0038 701/466 |
| 2013/0298181 | A1 * | 11/2013 | Smith .................. H04L 61/2539 726/1 |
| 2013/0305034 | A1 * | 11/2013 | Branson ................... H04L 9/088 713/150 |
| 2014/0310515 | A1 * | 10/2014 | Kim ........................ H04L 9/321 713/155 |

(Continued)

FOREIGN PATENT DOCUMENTS

| CN | 104994112 A | * | 7/2015 | |
| CN | 104994112 A | * | 10/2015 | ........... B64C 39/024 |

*Primary Examiner* — John B King
*Assistant Examiner* — Darshan I Dhruv
(74) *Attorney, Agent, or Firm* — Muncy, Geissler, Olds & Lowe, P.C.

(57) ABSTRACT

An authentication system and method for an electronic governor of an unmanned aerial vehicle is disclosed. By employing reciprocative authentication and encryption mechanisms between a main control terminal and an electronic governor, the use of a modified electronic governor is prevented and thus the illegal use of UAVs is also prevented. Moreover, the provided electronic governor may be operated in dual-mode to extend its compatibility to conventional main control terminals.

10 Claims, 6 Drawing Sheets

(56) References Cited

U.S. PATENT DOCUMENTS

| | | | |
|---|---|---|---|
| 2015/0339931 A1* | 11/2015 | Yu | G05D 1/0214 |
| | | | 701/122 |
| 2016/0210247 A1* | 7/2016 | Noll | G06F 12/1466 |
| 2016/0300495 A1* | 10/2016 | Kantor | G08G 5/0039 |
| 2017/0006417 A1* | 1/2017 | Canoy | H04L 63/126 |
| 2017/0076106 A1* | 3/2017 | Keidar | G06F 21/6218 |
| 2017/0098094 A1* | 4/2017 | Winslow | G06F 21/6218 |
| 2017/0108866 A1* | 4/2017 | Quinn | G05D 1/0011 |
| 2017/0127459 A1* | 5/2017 | Ye | B64C 39/024 |
| 2019/0114925 A1* | 4/2019 | Schulman | G06F 21/31 |

* cited by examiner

AUTHENTICATION SYSTEM AND METHOD FOR ELECTRONIC GOVERNOR OF UNMANNED AERIAL VEHICLE

CROSS-REFERENCE TO RELATED APPLICATION

This application claims the benefit of Taiwan Patent Application No. 104140611, filed Dec. 3, 2015 at the Taiwan Intellectual Property Office, the disclosure of which is incorporated herein in its entirety by reference.

BACKGROUND OF THE INVENTION

1. Field of the Invention

The present disclosure relates to an authentication system and method for an electronic governor of an unmanned aerial vehicle (UAV). More particularly, the present disclosure relates to an authentication system and method that is capable of determining, according to an authentication scheme, whether the electronic governor has been modified or not, by using a main control terminal that is coupled to the electronic governor.

2. Description of the Related Art

In past decades, small sized unmanned aircraft or model airplanes were generally only used for recreation purposes, and in competitions and shows, in the sport or pastime of aeromodelling. However, in recent years, with the rapid development of electronic technology, unmanned aerial vehicles (UAVs) have found many other uses and people have gradually started to pay more attention to the potential of UAVs.

Besides their use in aeromodelling, UAVs have been applied in many other fields. For example, a UAV equipped with a camera may be used to broadcast live a sports game or a concert, or may carry out aerial photography work, as well as many other applications. A UAV equipped with a GPS module may be used in mountain rescue, disaster monitoring, delivery of goods, airborne camerawork such as tracking and filming athletes in a sporting event, or in many other applications.

While the UAV market has recently been growing gradually, the use of UAVs has given rise to several problems regarding public safety. A UAV's loading capacity is determined in large part by the driving power of the motor; and this is critical, as a UAV with a greater loading capacity is able to carry more payload of a dangerous nature, and so would be more effective when used as an offensive weapon to cause damage or harm. The most popular UAV has a control system with a main control terminal that transmits control signals to an electronic governor, which then amplifies current to drive the brushless motor. In such a system, modification of the electronic governor and the motor could improve the loading capacity and flight range or maximum distance of the UAV.

However, currently there are no restrictions in place to prevent the modification of the electronic governor of UAVs. A person with malicious intent may modify or replace the electronic governor of a UAV to enable the UAV to carry a heavier load or fly farther. The modified UAV may then be capable of being used for some malicious and likely illegal purpose, as well as causing unintentional damage or casualties in an accident due to the increase drive power and payload. For this reason, many national aviation authorities, such as the United States (US) Federal Aviation Administration (FAA), have started to limit the freedom of UAV use without registration or license. This also has the effect of slowing the spread in the use of UAVs and thus their further development. A possible solution is to use an authentication and data encryption regime where a master control chip authenticates the electronic governor of the UAV. This will help prevent the illegal modification of the electronic governor, and so help prevent a malicious use of a UAV that requires greater load capacity or farther range.

SUMMARY OF THE INVENTION

An exemplary embodiment of the present disclosure provides an authentication system for an electronic governor of an unmanned aerial vehicle (UAV). The authentication system includes a main control terminal and at least one electronic governor. The main control terminal includes a first database, a first encryption and decryption module, and a first transceiver. The first database is configured to store authentication data, authenticated data and control data. The first encryption and decryption module is electrically coupled to the first database. The first transceiver is electrically coupled to the first encryption and decryption module. The at least one electronic governor includes a second transceiver, a second encryption and decryption module, a second database and a driver module. The first and second transceivers are able to transmit data between them. The second encryption and decryption module is electrically coupled to the second transceiver. The second database is electrically coupled to the second encryption and decryption module, and is configured to store the authentication data which is decrypted. The driver module is electrically coupled to the second encryption and decryption module and to a motor and is configured to control the motor. For operation, the main control terminal and the at least one electronic governor are coupled to each other and the main control terminal is started. Then, in an authentication stage, the first encryption and decryption module encrypts the authentication data stored in the first database, and then transmits the encrypted authentication data to the second transceiver via the first transceiver. Then, the second encryption and decryption module decrypts the received authentication data and stores the authentication data in the second database. After that, the second encryption and decryption module encrypts the authentication data and transmits the encrypted authentication data to the first transceiver via the second transceiver. Then, the first encryption and decryption module decrypts the received authentication data and checks whether the decrypted authentication data is the same as the authenticated data stored in the first database. If the decrypted authentication data is the same as the authenticated data stored in the first database, the main control terminal enters a control stage. In the control stage, the first encryption and decryption module encrypts the control data and transmits the encrypted control data to the second transceiver via the first transceiver. Then, still in the control stage, the second encryption and decryption module receives and decrypts the encrypted control data to generate a control signal, and the driver module controls a rotational speed of the motor according to the control signal.

Preferably, in the control stage, the first encryption and decryption module of the main control terminal encrypts the authentication data and the control data, and transmits the encrypted authentication data and the encrypted control data to the second transceiver via the first transceiver. Then, after decrypting the encrypted authentication data and the encrypted control data, the second encryption and decryption module determines whether the decrypted authentication data is the same as the authentication data stored in the second database. If the decrypted authentication data is the same as the authentication data stored in the second database, then the driver module controls the rotational speed of the motor according to the decrypted control signal. If, on the other hand, the decrypted authentication data is not the same as the authentication data stored in the second database, then the driver module disregards the decrypted control signal.

Preferably, if the second encryption and decryption module determines the received control data to be unencrypted, then the driver module controls the rotational speed of the motor according to the received control data.

Preferably, the first encryption and decryption module encrypts the authentication data first, and then the second encryption and decryption module decrypts the encrypted authentication data. After that, the second encryption and decryption module encrypts the authentication data again. Then, the first encryption and decryption module decrypts the authentication data encrypted by the second encryption and decryption module, thus generating the authenticated data which is stored in the first database.

Preferably, the main control terminal further includes a random number generator configured to generate the authentication data. The authenticated data is then generated according to the authentication data which is generated by the random number generator.

What follows is an exemplary embodiment of the present disclosure. The exemplary embodiment provides an authentication method for an electronic governor of an unmanned aerial vehicle (UAV). The authentication method is applied to the authentication system described above, and the authentication method includes the following steps. First, electrically coupling the main control terminal to the at least one electronic governor, and starting the main control terminal. Then, in an authentication stage, encrypting the authentication data stored in the first database by the first encryption and decryption module; transmitting the encrypted authentication data to the second transceiver via the first transceiver; receiving and decrypting the encrypted authentication data by the second encryption and decryption module; and storing the authentication data in the second database. After that and still in the authentication stage, encrypting the authentication data again by the second encryption and decryption module; transmitting the encrypted authentication data to the first transceiver via the second transceiver; decrypting the received authentication data by the first encryption and decryption module; and determining whether the received authentication data is the same as the authenticated data stored in the first database. If the received authentication data is the same as the authenticated data stored in the first database, then the main control terminal enters a control stage, which includes the following steps. Encrypting the control data by the first encryption and decryption module and transmitting the encrypted control data to the second transceiver via the first transceiver. Then, still in the control stage, decrypting the received control data by the second encryption and decryption module; and finally controlling the rotational speed of the motor by the driver module according to the decrypted control signal.

Preferably, in the control stage, the authentication method further includes the steps of: first, encrypting the authentication data and the control data by the encryption and decryption module; then, transmitting the authentication data to the second transceiver via the first transceiver; receiving and decrypting the encrypted authentication data and the control data by the second encryption and decryption module; determining whether the decrypted authentication data is the same as the authentication data previously stored in the second database by the second encryption and decryption module; and finally controlling the rotational speed of the motor by the driver module according to the decrypted control signal if the decrypted authentication data is the same as the authentication data previously stored in the second database; or on the other hand, disregarding the decrypted control signal if the decrypted authentication data is not the same as the authentication data previously stored in the second database.

Preferably, the driver module is configured to control the rotational speed of the motor according to the received control data in the case that the second encryption and decryption module determines that the received control data is unencrypted.

Preferably, prior to the authentication stage, the authenticated data stored in the first database is encrypted by the first encryption and decryption module. After that, the encrypted authenticated data is decrypted first and then encrypted again by the second encryption and decryption module. The authenticated data encrypted by the second encryption and decryption module is then decrypted again by the first encryption and decryption module, thus generating the authenticated data which is stored in the first database.

Preferably, the main control terminal further includes a random number generator configured to generate the authentication data. The authenticated data is generated according to the authentication data which is generated by the random number generator.

Advantages of the authentication system and method for an electronic governor of a UAV of the present disclosure include, but are not limited to, the following.

(1) The authentication system and method is able to prevent replacement of an authenticated electronic governor with an unauthenticated electronic governor that is able to function, for instance for use by a person with malicious intent. The control data transmitted to the electronic governor is also encrypted, which implies that the unauthenticated electronic governor is unable to function if it fails to decrypt the encrypted control signal. This adds a further safeguard for the authentication system and method to prevent the replacement of the authenticated electronic governor with the unauthenticated electronic governor with the aim of modify the UAV to carry a heavier load or fly farther for some illegal purpose.

(2) The authentication system and method may be operated in dual mode. That is to say, that the electronic governor is able to function with the driver module controlling the rotational speed of the motor according to the received control data, regardless of whether the control data is encrypted or unencrypted. This extends the compatibility of the electronic governor so that the electronic governor is able to function with conventional main control terminals.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

Figure 1:
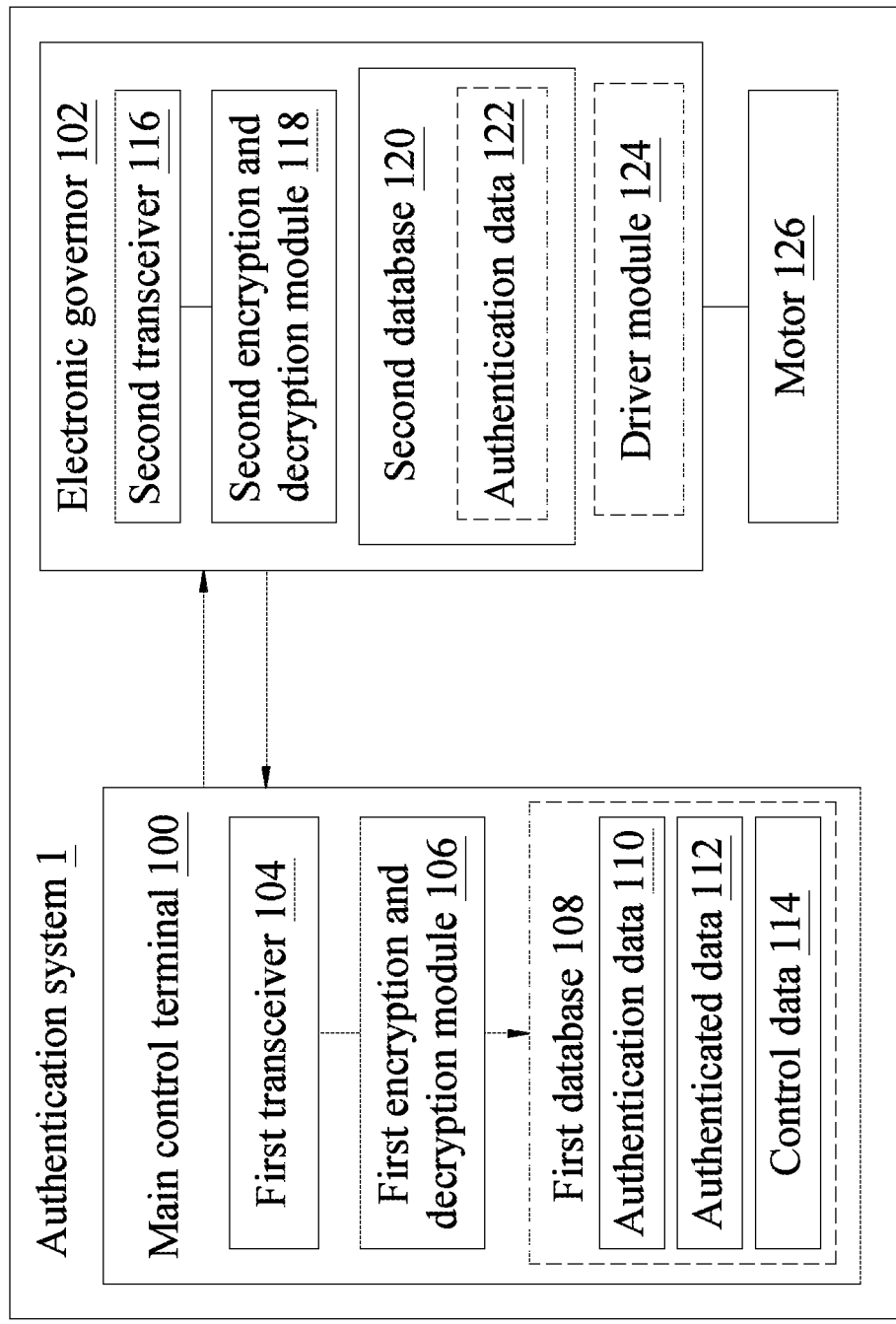
FIG. 1 is a block diagram of an embodiment of an authentication system for an electronic governor of an unmanned aerial vehicle (UAV) in accordance with the present disclosure.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

The following refers to FIG. 1, which is a block diagram of an embodiment of an authentication system for an electronic governor of an unmanned aerial vehicle (UAV) of the present disclosure. The authentication system 1 includes a main control terminal 100 and at least one electronic governor 102. The main control terminal 100 includes a first database 108, a first encryption and decryption module 106 and a first transceiver 104. The first database 108 is configured to store authentication data 110, authenticated data 112 and control data 114. The main control terminal 100 is wirelessly coupled to the flight controller through the first transceiver 104. The main control terminal 100 is also coupled to a power supply unit, such as a storage battery. The technology of the power supply unit is well known for a person with ordinary skill in the art, therefore the power supply unit is not described here any further. The main control terminal 100 includes a central processing unit, a microprocessor, a network processor, a microcontroller or an integrated circuit (IC) dedicated to carry out the functions of the aforementioned modules.

The first encryption and decryption module 106 is electrically coupled to the database 108. The first transceiver 104 is electrically coupled to the first encryption and decryption module 106. The electronic governor 102 includes a second transceiver 116, a second encryption and decryption module 118, a second database 120 and a driver module 124. The second transceiver 116 is electrically coupled to the first transceiver 104 in a wired or wireless manner for the purpose of data transmission. The second encryption and decryption module 118 is electrically coupled to the second transceiver 116. The second database 120 is configured to store authentication data 122 which is decrypted. The driver module 124 is electrically coupled to the motor 126 and configured to control the motor 126.

Preferably, the first transceiver 104 and second transceiver 116 may be a WiMax module, a Wi-Fi module, a Bluetooth module, a 2G/3G/4G or LTE module, or the like, so as to enable communication between the two transceivers using the same chosen protocol. For example, the Wi-Fi module is able to communicate with other Wi-Fi communication devices (such as a wireless access point which is also known as a base station, other Wi-Fi nodes in a wireless ad hoc network, or the like) that are compliant with the Wi-Fi or 802.11 protocol, whereas the Bluetooth module is able to communicate with other Bluetooth communication devices (such as a mobile telephone, a Bluetooth headphone or the like) that are compliant with the Bluetooth or 802.15 protocol. The first database 108 or second database 120 may be a semiconductor memory device (such as a flash memory device), an auxiliary memory device (such as a hard disk drive or solid state drive), or storage media (such as a Digital Versatile Disk or an SD memory card).

In order to prevent the use of an illegally modified electronic governor, the authentication and data encryption scheme must be installed between the main control terminal 100 and the electronic governor 102 of a UAV. On coupling of the main control terminal 100 to the electronic governor 102 and powering of the main control terminal 100, the authentication system 1 enters an authentication stage. In the authentication stage, the first encryption and decryption module 106 encrypts the authentication data 110 stored in the first database 108, and the encrypted authentication data 110 is transmitted to the second transceiver 116 via the first transceiver 104. Preferably, the authentication data 110 is a unique ID of the UAV which has been previously set in the factory that manufactures the UAV. The second encryption and decryption module 118 decrypts the received authentication data 110, and stores the decrypted authentication data 110 as the authentication data 122 in the second database 120. The first encryption and decryption module 106 and the second encryption and decryption module 118 apply an encryption and decryption algorithm that may be a disk encryption algorithm which supports the CBC, LRW, XEX, XTS, CMC, EME or ESSIV encryption algorithms. The first and second encryption and decryption modules 106 and 118 may apply the above-mentioned encryption algorithms with a key of 128 bits or 256 bits to perform encryption and decryption of the data.

Still in the authentication stage, the second encryption and decryption module 118 then encrypts the authentication data 122 again, and transmits the encrypted authentication data 122 to the first transceiver 104 via the second transceiver 116. The first encryption and decryption module 106 then decrypts the received authentication data 122, and checks whether the decrypted authentication data 122 is the same as the authenticated data 112 stored in the first database 108. If the decrypted authentication data 122 is the same as the authenticated data 112, the main control terminal 100 is permitted to receive the control command from a flight controller to control the UAV. The main control terminal 100 then generates the control data 114, and the control data 114 is stored in the first database 108. In order to control the motor 126, the first encryption and decryption module 106 encrypts the control data 114 and transmits the encrypted control data 114 to the second transceiver 116 via the first transceiver 104. Next, the second encryption and decryption module 118 decrypts the received control data 114 to generate a control signal, and then the driver module 124 controls the rotational speed of the motor 126 according to the control signal. If, on the other hand, the first encryption and decryption module 106 determines that the authentication data 122 is different from the authenticated data 112 of the first database 108, then the electronic governor 102 is not an authenticated electronic governor and the main control terminal 100 is not permitted to control the motor 126 of the electronic governor 102, thereby preventing the use of an illegally modified electronic governor of the UAV.

In another embodiment of the authentication system 1, a control stage follows the storage of the decrypted authentication data 110 as the authentication data 122 in the second database 120. The authentication data 110 and control data 114 are encrypted by the first encryption and decryption module 106 of the main control terminal 100. Then the encrypted authentication data 110 and control data 114 are transmitted to the second transceiver 116 via the first transceiver 104. The second encryption and decryption module 118 then decrypts the authentication data 110 and control data 114, and from the decrypted control data 114 results a control signal. The second encryption and decryption module 118 then determines whether the decrypted authentication data 110 is the same or not the same as the authentication data 122 previously stored in the second database 120. If the decrypted authentication data 110 is the same as the authentication data 122 previously stored in the second database 120, then the driver module 124 controls the rotational speed of the motor 126 according to the decrypted control signal. If, on the other hand, the decrypted authentication data 110 is not the same as the authentication data 122 previously stored in the second database 120, then the control signal is ignored. As a result, the authentication system 1 is able to prevent a person with malicious intent from using an unauthenticated electronic governor. The encryption of the control data 114 prior to being sent to the electronic governor is a further safeguard that adds to the difficulty for a person with malicious intent to use the unauthenticated electronic governor that has been modified to allow the UAV to carry a heavier load or to fly farther.

Regarding the authentication stage, the following may be carried out in advance. The authentication data is encrypted by the first encryption and decryption module 106. Then, the second encryption and decryption module 118 decrypts the encrypted authentication data first and then encrypts the authentication data again. The first encryption and decryption module 106 then decrypts the authentication data encrypted by the second encryption and decryption module 118, to generate the authenticated data 112 which is stored in the first database 108. When the main control terminal 100 and the electronic governor 102 are coupled to each other, the resulting authentication data decrypted by the first encryption and decryption module 106 must be the same as the authenticated data 112 stored in the first database 108 for authentication of the electronic governor 102.

Figure 2:
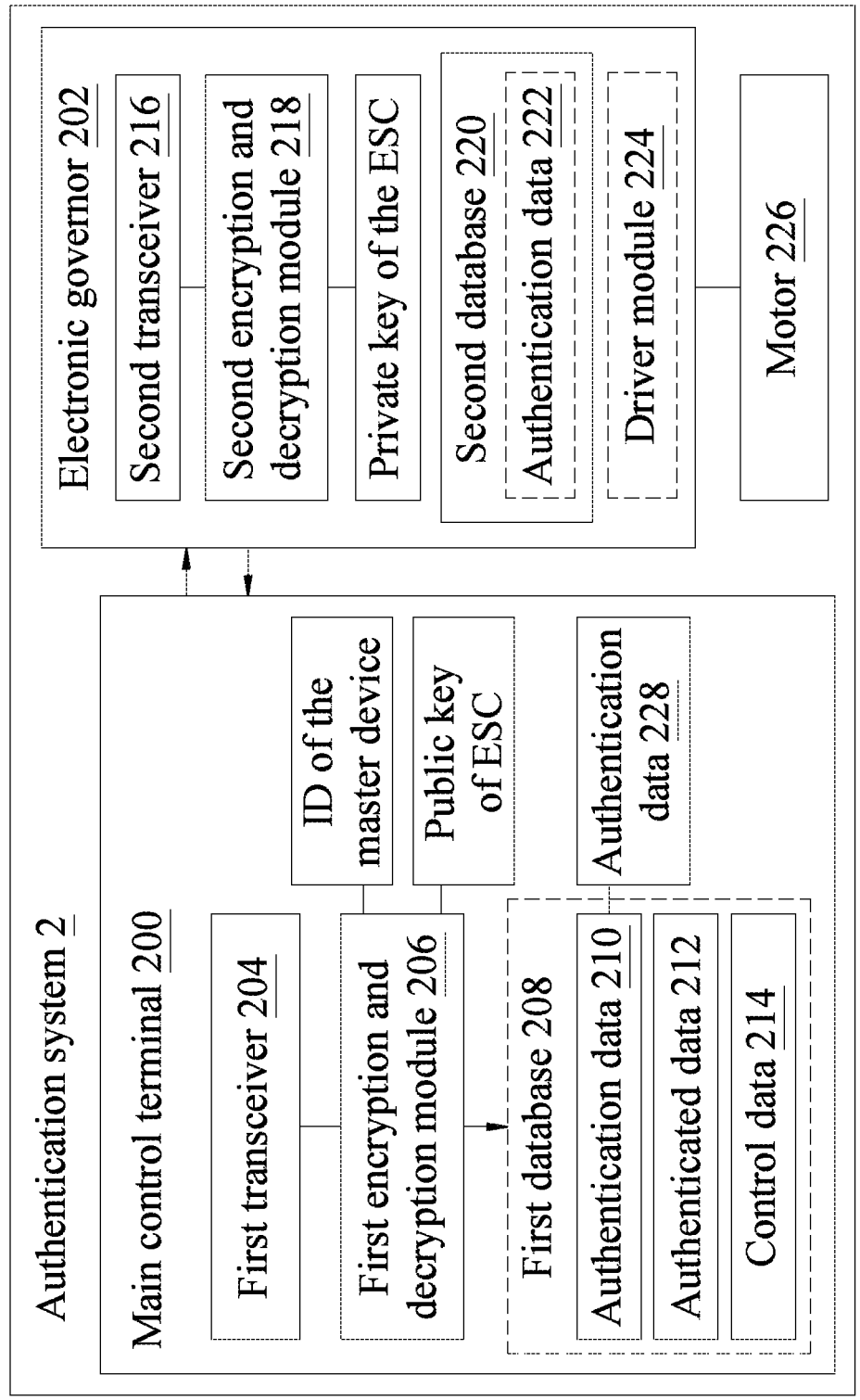
FIG. 2 is a block diagram of another embodiment of the authentication system for an electronic governor of a UAV in accordance with the present disclosure.

The following refers to FIG. 2, which is a block diagram of another embodiment of the authentication system for an electronic governor of a UAV of the present disclosure. The authentication system 2 for the electronic governor of the UAV includes a main control terminal 200 and at least one electronic governor 202. The main control terminal 200 includes a first database 208, a first encryption and decryption module 206 and a first transceiver 204. The first database 208 is configured to store authentication data 210, authenticated data 212 and control data 214. The electronic governor 202 includes a second transceiver 216, a second encryption and decryption module 218, a second database 220 and a driver module 224. The configuration of these elements is the same as that of the authentication system 1 of the embodiment illustrated in FIG. 1, so their detailed description is not repeated here. The difference between the present embodiment and the former embodiment illustrated in FIG. 1, is that in the present embodiment the main control terminal 200 further includes a random number generator 228 configured to generate the authentication data 210. This results in the authenticated data 212 being generated from the authentication data 210, which is itself generated by the random number generator 228. In the authentication stage, when the first encryption and decryption module 206 encrypts the authentication data 210, the authentication data 210 is combined with the ID of the master device, the master device being the main control terminal 200, and the combined data is then encrypted using a public key of the electronic governor 202. After that, the second encryption and decryption module 218 decrypts the received authentication data by using a private key of the ESC, to obtain the authentication data 222.

The control data 114 and 214 may be pulse-width modulation (PWM) signals. The first encryption and decryption module 206 may encrypt the PWM signals by using the public key of the ESC, in order to prevent use of an unauthenticated electronic governor. That is to say, the functioning of the electronic governor depends on the electronic governor being able to decrypt the received encrypted control data 214.

The electronic governors 102 and 202 of the present disclosure are able to operate in dual mode so that the electronic governors 102 and 202 are compatible with the main control terminals that are commercially available. Dual mode includes the mode where the driver modules 114 and 224 directly control the rotational speeds of the motors 126 and 226 according to the received control data, even though the second encryption and decryption modules 118 and 218 of the electronic governors 102 and 202 have determined that the received control data is not encrypted. The received control data is not encrypted when the main control terminal coupled to the electronic governor 102 or 202 is a conventional main control terminal. Therefore, by operating the authentication system in dual-mode, the electronic governor is able to receive the control data in encrypted or unencrypted form. This extends the compatibility of the electronic governor with the authentication function, so that the electronic governor is also able to function with conventional main control terminals.

Figure 3:
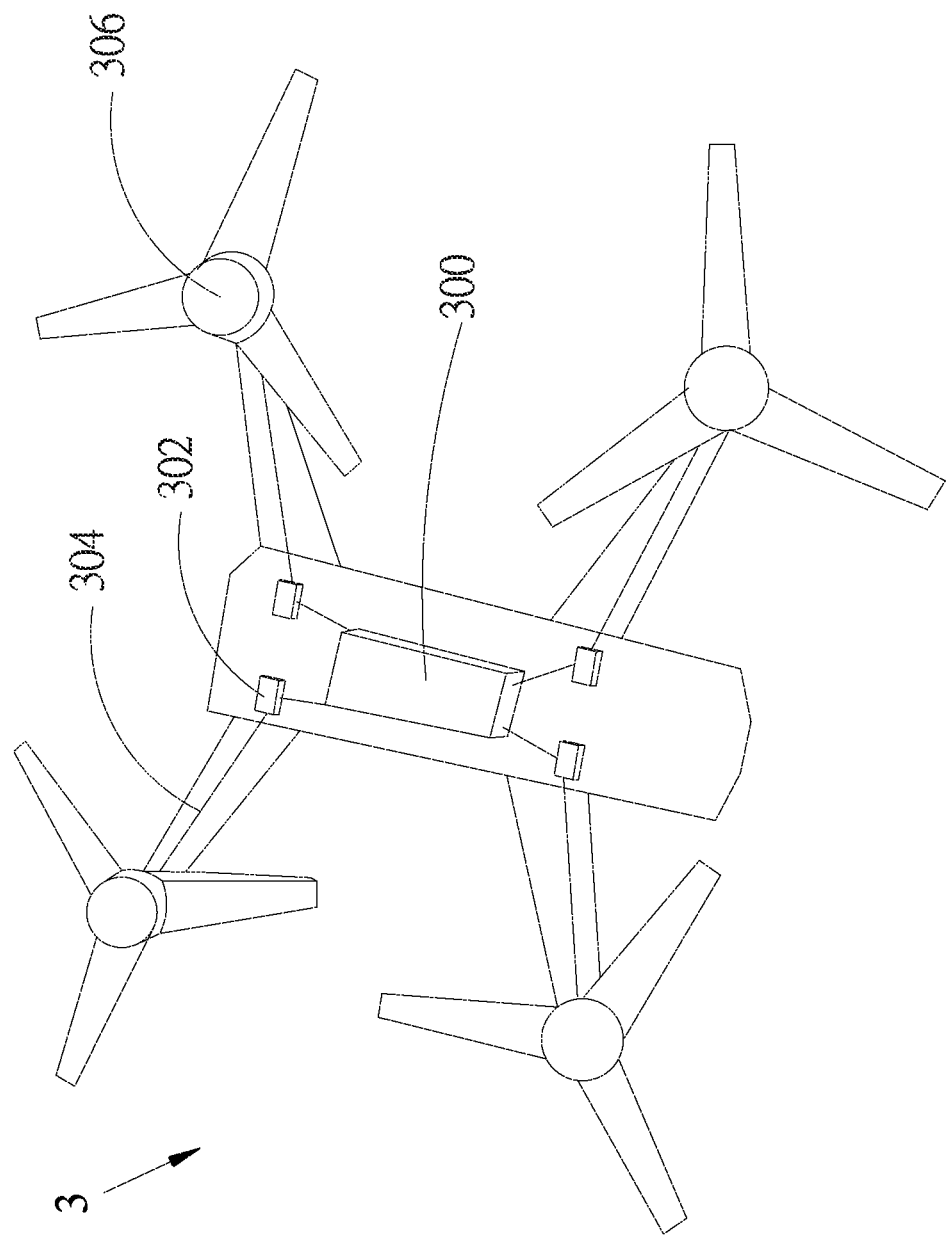
FIG. 3 is a schematic view of the authentication system of the present disclosure, showing the authentication system installed in the UAV.

The following refers to FIG. 3, which is a schematic view of the authentication system and the UAV the authentication system is applied to, in accordance with the present disclosure. Four motors 306 of an unmanned aerial vehicle 3 are coupled to each of multiple electronic governors 302 through electronic wire 304, and each of the electronic governors 302 is coupled to the main control terminal 300 through data wire. The configuration of the main control terminal 300 and of the electronic governors 302 is the same as that in the previous embodiments, so their detailed description is not repeated here. The authentication scheme provided by the authentication system for an electronic governor of a UAV does not allow the user to use a new electronic governor after replacement of any of the electronic governors 302 until the new electronic governor is authenticated. Also, the electronic governor of the present disclosure is able to function in dual-mode, such that if the electronic governor of the present disclosure detects that the received control signal is an unencrypted signal, the driver module is still able to directly drive the motor 306 according to the control signal. This dual-mode function allows for the use of conventional main control terminals, which produce an unencrypted control signal. Therefore, such conventional main control terminals can still be used with the electronic governor 302 of the present disclosure, even though conventional main control terminals are not fully compliant with the authentication scheme of the present disclosure.

An authentication method adapted to the authentication system for an electronic governor of an unmanned aerial vehicle of the present disclosure is described below, with reference to the accompanying drawings. The following steps are reproduced from the flow charts of FIGS. 4, 5A and 5B, and are each followed with further description.

Figure 4:
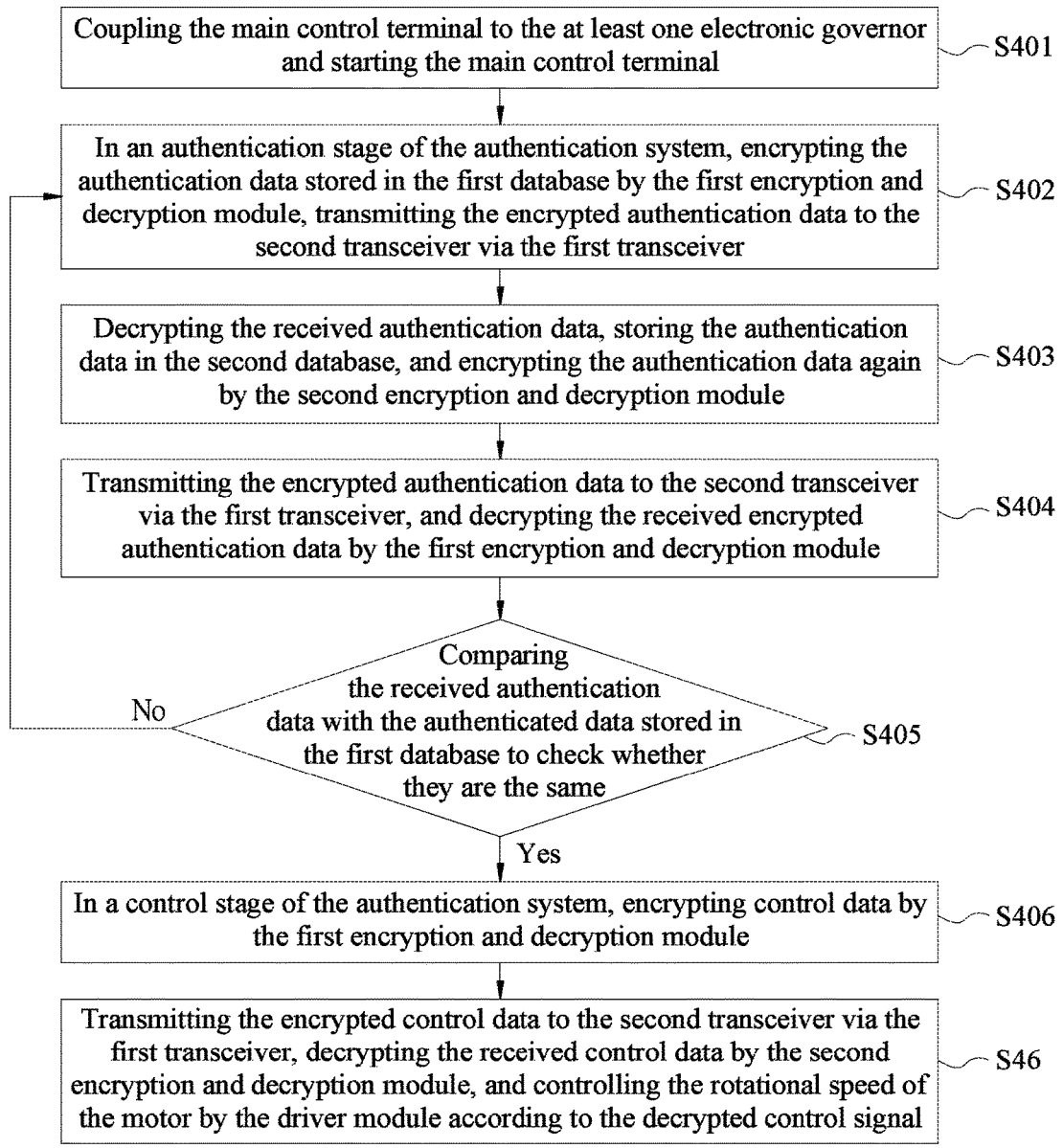
FIG. 4 is a flowchart of an embodiment of an authentication method for an electronic governor of a UAV in accordance with the present disclosure.

The following refers to FIG. 4, which is a flowchart of an embodiment of the authentication method for an electronic governor of a UAV, in accordance with the present disclosure. The authentication method includes following steps.

S401: Coupling the main control terminal to the at least one electronic governor and starting the main control terminal. When the UAV is supplied with power, the main control terminal starts to authenticate the electronic governor.

S402: In an authentication stage of the authentication system, encrypting the authentication data stored in the first database by the first encryption and decryption module, and transmitting the encrypted authentication data to the second transceiver via the first transceiver. The authentication data 112 may be a unique ID of the UAV which has been previously set in the factory that manufactures the UAV.

S403: Decrypting the received authentication data by the second encryption and decryption module, storing the authentication data in the second database, and encrypting the authentication data again by the second encryption and decryption module. The encryption and decryption algorithm applied by the first and second encryption and decryption modules may be one of the encryption algorithms already described in the previous embodiments, and so their detailed description is not repeated here.

S404: Transmitting the encrypted authentication data to the second transceiver via the first transceiver, and decrypting the received encrypted authentication data by the first encryption and decryption module.

S405: Comparing the received authentication data with the authenticated data stored in the first database. If the received authentication data is the same as the authenticated data, the authentication method proceeds to a step S406 where in a control stage of the authentication system, the first encryption and decryption module encrypts the control data, and after that a step S407 follows, which is described below. If, on the other hand, the received authentication data is not the same as the authenticated data, the authentication system returns to the step S402 after a time period. The authentication system then carries out the step S402 again, where the first encryption and decryption module again encrypts the authentication data stored in the first database, and the encrypted authentication data is again transmitted to the second transceiver via the first transceiver.

S407: Transmitting the encrypted control data to the second transceiver via the first transceiver, decrypting the received control data by the second encryption and decryption module, and controlling the rotational speed of the motor according to the decrypted control signal.

Figure 5A:
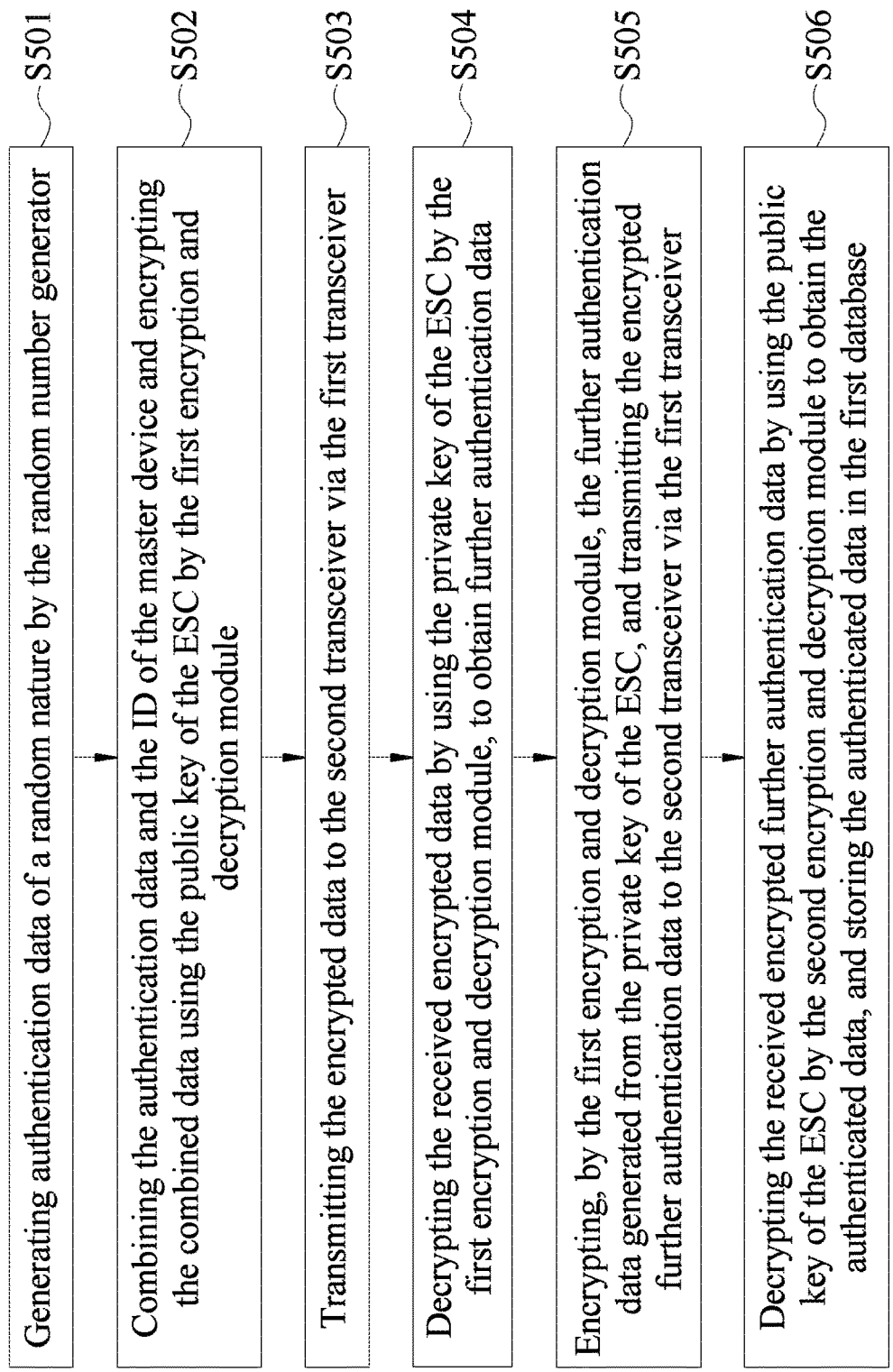
FIGS. 5A and 5B are flowcharts of another embodiment of the authentication method for an electronic governor of a UAV in accordance with the present disclosure.
Figure 5B:
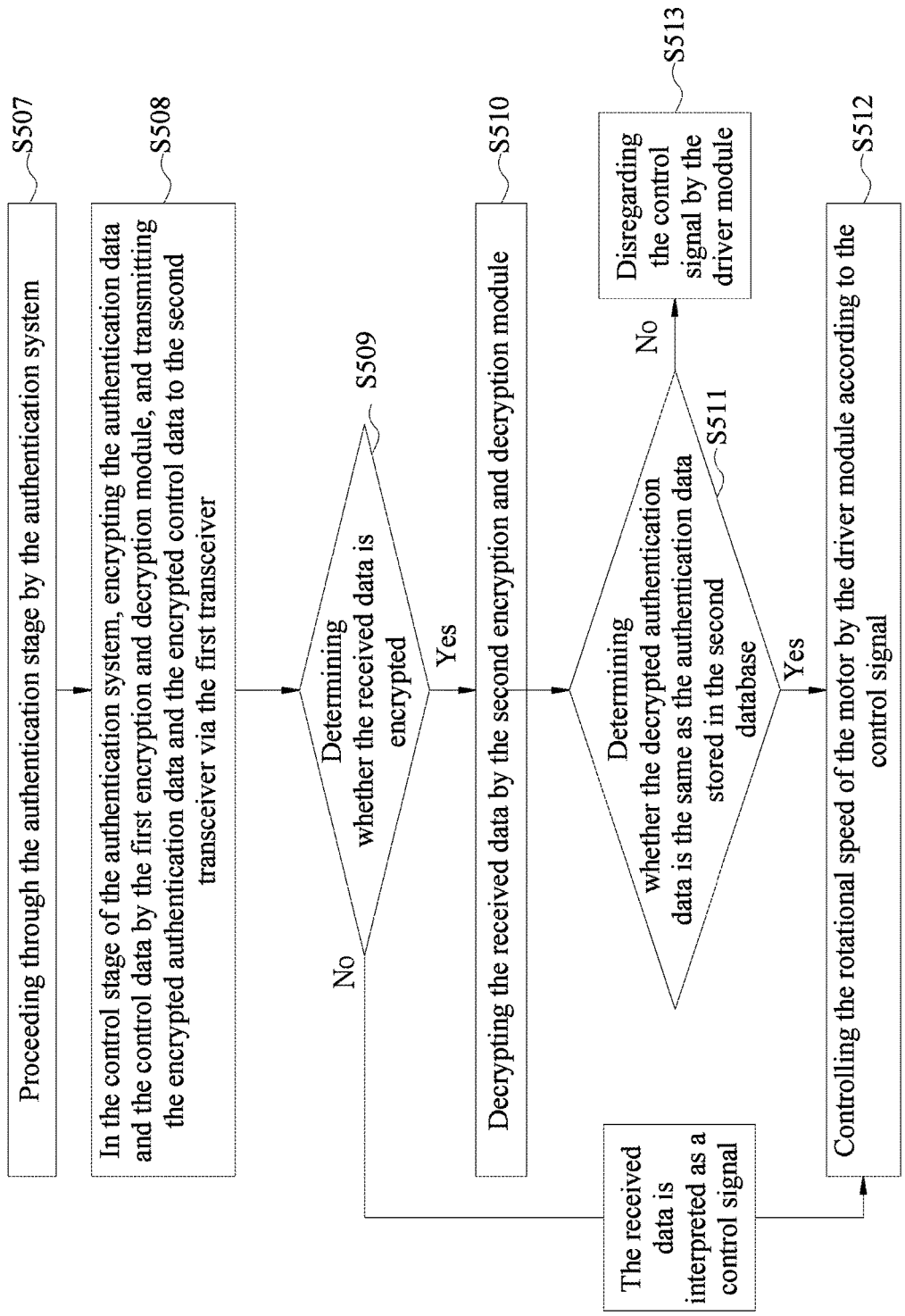

The following refers to FIGS. 5A and 5B, which are flowcharts of another embodiment of the authentication method for an electronic governor of a UAV, in accordance with the present disclosure. This embodiment of the authentication method for an electronic governor of an unmanned aerial vehicle may also be applied to the authentication system of the present disclosure. The embodiment includes a pre-authentication stage, an authentication stage and a control stage. The pre-authentication stage includes following steps, which are also shown in FIG. 5A.

S501: Generating authentication data of a random nature by the random number generator.

S502: Combining the authentication data and the ID of the master device and encrypting the combined data by using the public key of the ESC by the first encryption and decryption module.

S503: Transmitting the encrypted data to the second transceiver via the first transceiver.

S504: Decrypting the received encrypted data by using the private key of the ESC by the first encryption and decryption module, to obtain further authentication data.

S505: Encrypting, by the first encryption and decryption module, the further authentication data which was generated in step S504 by using the private key of the ESC, and transmitting the encrypted further authentication data to the second transceiver via the first transceiver.

S506: Decrypting the received encrypted further authentication data by using the public key of the ESC by the second encryption and decryption module to obtain the authenticated data, and storing the authenticated data in the first database.

The authentication stage and the control stage include the following steps, which are also shown in FIG. 5B.

S507: In the authentication stage of the authentication system, carrying out the above-described steps S401-S405, whose detailed descriptions are not repeated here.

S508: In the control stage of the authentication system, encrypting the authentication data and the control data by the first encryption and decryption module, and transmitting the encrypted authentication data and the encrypted control data to the second transceiver via the first transceiver.

S509: Determining whether the received data is encrypted by the second encryption and decryption module. Then, if the received data is encrypted, decrypting the received data in a step S510 by the second encryption and decryption module. Then, after that, proceeding with a step S511. However, on the other hand, if the received data is not encrypted, then interpreting the received control data as a control signal, and then in a step S512, controlling the rotational speed of the motor by the driver module according to the control signal.

S511: Determining whether the decrypted authentication data is the same as the authentication data stored in the second database. Then, if the decrypted authentication data is the same as the authentication data stored in the second database, controlling the rotational speed of the motor by the driver module according to the control signal, which is the step S512. However, on the other hand, if the decrypted authentication data is not the same as the authentication data stored in the second database, then disregarding the control signal by the driver module.

In summary, the authentication system and the method thereof of the present disclosure is able to prevent replacement of an authenticated electronic governor with an unauthenticated electronic governor that is able to function. The control data transmitted to the electronic governor is also encrypted, which implies that the unauthenticated electronic governor is unable to function if it fails to decrypt the encrypted control signal. This adds a further safeguard in preventing people with malicious intent from using an unauthenticated electronic governor that has been modified so that the unmanned aerial vehicle is able to carry heavier loads or fly farther. Another feature is that the authentication system and method for an electronic governor of a UAV may be selectively operated in two modes, one mode for operating with encrypted control data and the other mode for operating with unencrypted control data, thereby extending the compatibility of the electronic governor so that the electronic governor is also able to function with conventional main control terminals that do not encrypt the control data.

The invention disclosed herein has been described by means of specific embodiments. However, numerous modifications, variations and enhancements can be made thereto by those skilled in the art without departing from the spirit and scope of the invention set forth in the claims.

What is claimed is:

1. An authentication system for preventing modification of an unmanned aerial vehicle, comprising:
   a main control terminal, comprising:
      a first database configured to store authentication data, authenticated data and control data;
      a first encryption and decryption circuit electrically coupled to the first database; and
      a first transceiver electrically coupled to the first encryption and decryption circuit; and
   at least one electronic governor, comprising:
      a second transceiver configured to perform data transmission to and from the first transceiver;
      a second encryption and decryption circuit electrically coupled with the second transceiver;
      a second database configured to store the authentication data which is decrypted; and
      a driver electrically coupled with a motor and configured to control the motor;
      wherein, the main control terminal and the at least one electronic governor are installed on the unmanned aerial vehicle, and when the main control terminal and the at least one electronic governor are electrically coupled to each other and the main control terminal is started in order to enter an authentication stage,
      the first encryption and decryption circuit encrypts the authentication data stored in the first database and transmits the encrypted authentication data to the second transceiver via the first transceiver,
      then, the second encryption and decryption circuit decrypts the received authentication data and stores the authentication data in the second database,
      after that, the second encryption and decryption circuit encrypts the authentication data and transmits the encrypted authentication data to the first transceiver via the second transceiver,
      then, the first encryption and decryption circuit decrypts the received authentication data and determines whether the decrypted authentication data is the same as the authenticated data stored in the first database,
      such that when the decrypted authentication data is the same as the authenticated data stored in the first database, then the main control terminal enters a control stage,
      wherein the first encryption and decryption circuit encrypts the control data and transmits the encrypted control data to the second transceiver via the first transceiver, the second encryption and decryption circuit receives and decrypts the encrypted control data generating a control signal, and the driver controls a rotational speed of the motor according to the control signal.

2. The authentication system of claim 1, wherein, in the control stage,
   the first encryption and decryption circuit of the main control terminal encrypts the authentication data and the control data, and transmits the encrypted authentication data and the encrypted control data to the second transceiver via the first transceiver,
   then, the second encryption and decryption circuit decrypts the encrypted authentication data and the encrypted control data,
   wherein the decrypted control data results in a control signal,
   and the second encryption and decryption circuit determines whether the decrypted authentication data is the same as the authentication data stored in the second database,
   such that when the decrypted authentication data is the same as the authentication data stored in the second database, then the driver controls the rotational speed of the motor according to the decrypted control signal,
   and, on the other hand, when the decrypted authentication data is not the same as the authentication data stored in the second database, then the driver disregards the decrypted control signal.

3. The authentication system of claim 1, wherein in the control stage, the first encryption and decryption circuit selectively encrypts the control data and transmits the encrypted or unencrypted control data to the second transceiver via the first transceiver, when the second encryption and decryption circuit determines that the received control data is unencrypted, then the driver controls the rotational speed of the motor according to the received control data.

4. The authentication system of claim 1, wherein, prior to the authentication stage,
   the first encryption and decryption circuit encrypts the authentication data,
   after that, the second encryption and decryption circuit decrypts the encrypted authentication data and then encrypts the authentication data again,
   then, the first encryption and decryption circuit decrypts the authentication data encrypted by the second encryption and decryption circuit, generating the authenticated data, and
   then, the authenticated data is stored in the first database.

5. The authentication system of claim 4, wherein the main control terminal further comprises a random number generator configured to generate the authentication data, and the authenticated data is generated according to the authentication data generated by the random number generator.

6. An authentication method for providing modification of an unmanned aerial vehicle, the authentication method comprising the steps of:

disposing a main control terminal and at least one electronic governor on the unmanned aerial vehicle;

electrically coupling the main control terminal with the at least one electronic governor, and starting the main control terminal;

in an authentication stage, encrypting an authentication data stored in a first database, by a first encryption and decryption circuit;

transmitting the encrypted authentication data to a second transceiver via a first transceiver;

receiving the encrypted authentication data, and decrypting the encrypted authentication data by a second encryption and decryption circuit, and storing the authentication data in a second database;

encrypting the authentication data again, by the second encryption and decryption circuit;

transmitting the encrypted authentication data to the first transceiver via the second transceiver;

decrypting the received authentication data, by the first encryption and decryption circuit;

determining whether the received authentication data is the same as the authenticated data stored in the first database, such that when the received authentication data is the same as the authenticated data stored in the first database, then the main control terminal enters a control stage, and the control stage comprising the steps of:

encrypting the control data by the first encryption and decryption circuit and transmitting the encrypted control data to the second transceiver via the first transceiver;

decrypting the received control data by the second encryption and decryption circuit wherein the decrypted control data results in a control signal; and controlling a rotational speed of a motor by a driver according to the decrypted control signal.

7. The authentication method of claim 6, wherein, in the control stage, the authentication method further comprises the steps of:

encrypting the authentication data and the control data by the first encryption and decryption circuit;

transmitting the authentication data to the second transceiver via the first transceiver;

receiving and decrypting the encrypted authentication data and the encrypted control data by the second encryption and decryption circuit;

determining whether the decrypted authentication data is the same as the authentication data previously stored in the second database, by the second encryption and decryption circuit;

controlling the rotational speed of the motor by the driver according to the decrypted control signal, in the case that the decrypted authentication data is the same as the authentication data previously stored in the second database;

disregarding the decrypted control signal in the case that the decrypted authentication data is not the same as the authentication data previously stored in the second database.

8. The authentication method of claim 6, wherein in the control stage, the first encryption and decryption circuit selectively encrypts the control data and transmits the encrypted or unencrypted control data to the second transceiver via the first transceiver, the driver is configured to control the rotational speed of the motor according to the received control data in the case that the second encryption and decryption circuit determines that the received control data is unencrypted.

9. The authentication method of claim 6, wherein, in advance of the authentication stage, the authenticated data stored in the first database is encrypted by the first encryption and decryption circuit, after that the encrypted authenticated data is decrypted first and then encrypted again by the second encryption and decryption circuit, then the authenticated data encrypted by the second encryption and decryption circuit is decrypted again by the first encryption and decryption circuit in order to generate the authenticated data, and then the authenticated data is stored in the first database.

10. The authentication method of claim 9, wherein the main control terminal further comprises a random number generator configured to generate the authentication data, and the authenticated data is generated according to the authentication data generated by the random number generator.

* * * * *